(12) United States Patent
Kim et al.

(10) Patent No.: US 11,217,241 B2
(45) Date of Patent: Jan. 4, 2022

(54) METHOD FOR PROVIDING CONTENT AND ELECTRONIC DEVICE SUPPORTING THE SAME

(71) Applicant: Samsung Electronics Co., Ltd., Gyeonggi-do (KR)

(72) Inventors: Hogon Kim, Gyeonggi-do (KR); Jaeho Seo, Gyeonggi-do (KR); Byungsoo Kim, Gyeonggi-do (KR); Bumsu Shin, Gyeonggi-do (KR); Jiyoung Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 263 days.

(21) Appl. No.: 16/383,968

(22) Filed: Apr. 15, 2019

(65) Prior Publication Data

US 2019/0341042 A1 Nov. 7, 2019

(30) Foreign Application Priority Data

May 4, 2018 (KR) ........................ 10-2018-0051931

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/063* (2013.01); *H04L 67/12* (2013.01); *G10L 2015/223* (2013.01)

(58) Field of Classification Search
CPC ... G10L 15/22; G10L 15/30; G10L 2015/223; G10L 13/033; G10L 15/00; G10L 15/063; G10L 15/14; G10L 15/16; G10L 15/1815; G10L 15/26; G10L 19/00; G10L 2015/226; G10L 2015/227; G10L 2105/228;

(Continued)

(56) References Cited

U.S. PATENT DOCUMENTS 7,827,239 B2 * 11/2010 Bodin .................... G06F 16/487
709/204
9,582,245 B2 * 2/2017 Kim .................. H04N 21/42203
(Continued)

OTHER PUBLICATIONS

International Search Report dated Jul. 25, 2019.
European Search Report dated Mar. 12, 2021.

*Primary Examiner* — Vijay B Chawan
(74) *Attorney, Agent, or Firm* — Cha & Reiter, LLC

(57) ABSTRACT

An electronic device and a computer program product are provided herein. The electronic device includes: an audio module, a communication module, a microphone, a memory storing programming instructions, and a processor, which executes the program product, causing the electronic device to receive a voice command from a user via the microphone, request, upon receiving the voice command, situation information from a first external electronic device based on device information and the voice command, and after receiving the situation information, transmit the situation information to a second external electronic device via the communication module, and receiving content corresponding to the situation information from the second external electronic device and reproducing the received content.

20 Claims, 12 Drawing Sheets

(51) Int. Cl.
*H04L 29/08* (2006.01)
*G10L 15/06* (2013.01)

(58) Field of Classification Search
CPC ..... G10L 25/54; G10L 25/63; G06F 16/9535; G06F 3/0488; G06F 3/04817; G06F 3/0482; G06F 3/04847; G06F 3/167; G06F 16/24578; G06F 16/3344; G06F 16/337; G06F 16/358; G06F 16/437; H04L 12/1812; H04L 12/2816; H04L 12/2829; H04L 12/2834; H04L 43/045; H04L 67/10; H04L 67/12; H04N 21/231; H04N 21/233; H04N 21/42203; H04N 21/42204; H04N 21/4394; H04N 21/4668; H04N 21/6543; H04N 21/6547; H04N 21/6582
USPC ...................................... 704/270.1, 270, 275
See application file for complete search history.

(56) References Cited

U.S. PATENT DOCUMENTS

| | | | |
|---|---|---|---|
| 9,659,068 B1* | 5/2017 | Mattsson | G06F 16/637 |
| 10,522,143 B2* | 12/2019 | Chandrasekaran | G09B 7/02 |
| 2014/0114659 A1* | 4/2014 | Sharifi | G10L 19/00 |
| | | | 704/235 |
| 2015/0019342 A1* | 1/2015 | Gupta | G06Q 30/0269 |
| | | | 705/14.66 |
| 2016/0260135 A1* | 9/2016 | Zomet | H04L 12/2834 |
| 2017/0250930 A1* | 8/2017 | Ben-Itzhak | G06F 3/011 |
| 2017/0345420 A1* | 11/2017 | Barnett, Jr. | G10L 15/22 |
| 2018/0191860 A1* | 7/2018 | Ghafourifar | G06N 5/022 |
| 2018/0204111 A1* | 7/2018 | Zadeh | G06N 3/0436 |
| 2018/0278740 A1* | 9/2018 | Choi | H04M 1/72403 |
| 2018/0342329 A1* | 11/2018 | Rufo | H04L 12/2812 |
| 2019/0260866 A1* | 8/2019 | Choi | H04M 1/72469 |

* cited by examiner

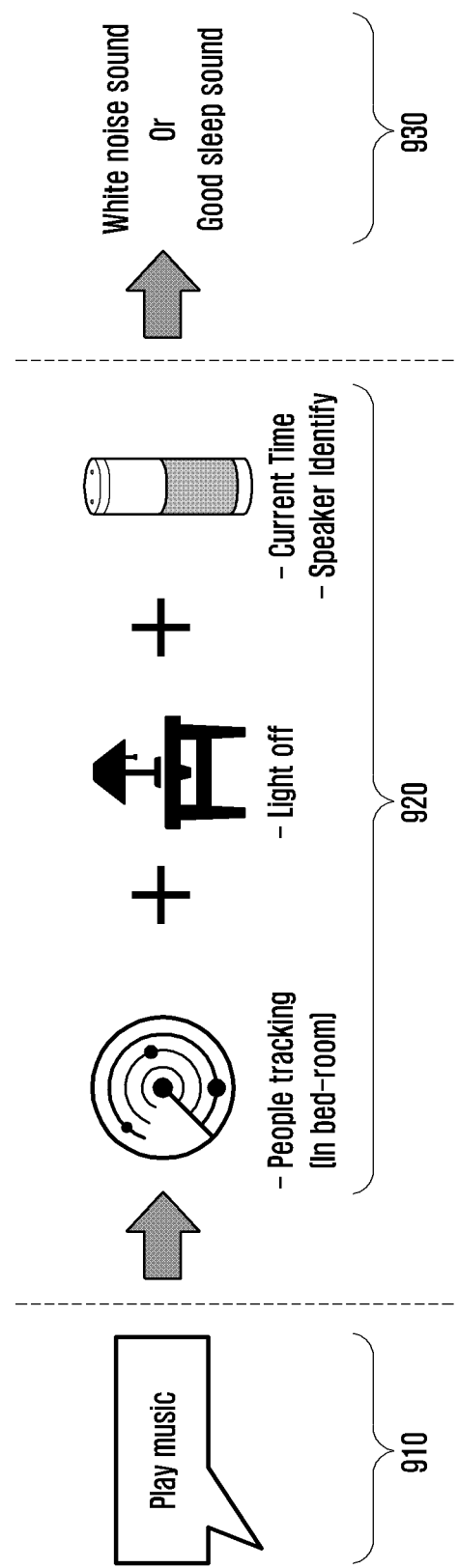

METHOD FOR PROVIDING CONTENT AND ELECTRONIC DEVICE SUPPORTING THE SAME

CROSS-REFERENCE TO RELATED APPLICATION(S)

This application is based on and claims priority under 35 U.S.C. § 119 to Korean Patent Application No. 10-2018-0051931, filed on May 4, 2018, in the Korean Intellectual Property Office, the disclosure of which is incorporated by reference herein in its entirety.

TECHNICAL FIELD

Certain embodiments of the present disclosure relate to a method of providing content and an electronic device supporting the method.

BACKGROUND

Electronic devices such as smartphones and artificial intelligence speakers can play multimedia content (e.g., music or video) over the network in real time. By using such a streaming service, the user of an electronic device can enjoy various kinds of multimedia content without permanently storing content in the memory of the electronic device.

Meanwhile, when receiving a streaming service, the user of an electronic device may issue a recommendation request for appropriate content without specifying specific content. In the related art, the content provider may provide requested appropriate content to the user having a particular account in consideration of the history of the content the user has listened to, or the preference information such as likes or dislikes the user has left about the content. However, as the usage history and the user preferences are related only with data accumulated in the past, it may be difficult for the electronic device to provide content suitable for the current situation of the user.

SUMMARY

Accordingly, an aspect of the present disclosure is to provide a method that enables an electronic device to provide the user with appropriate content in real time in consideration of user's situation information.

In accordance with an aspect of the present disclosure, an electronic device is provided. The electronic device may include: an audio module; a communication module; a microphone; a memory; and a processor. The processor may be configured to control: receiving a voice command from a user via the microphone; requesting, upon receiving the voice command, a first external electronic device to obtain situation information based on device information and the voice command, and transmit the obtained situation information to a second external electronic device; and reproducing, upon receiving content corresponding to the situation information from the second external electronic device, the received content.

In accordance with another aspect of the present disclosure, an electronic device is provided. The electronic device may include: an audio module; a communication module; a microphone; a memory; and a processor. The processor may be configured to control: receiving a voice command from a user via the microphone; receiving, upon receiving the voice command, device information from a first external electronic device; obtaining situation information based on the device information and the voice command; transmitting the situation information to a second external electronic device; and reproducing, upon receiving content corresponding to the situation information from the second external electronic device, the received content.

In accordance with another aspect of the present disclosure, an electronic device is provided. The electronic device may include: an audio module; a communication module; a microphone; a memory; and a processor. The processor may be configured to control: receiving a voice command from a user via the microphone; requesting, upon receiving the voice command, an external electronic device to obtain situation information based on device information and the voice command, and transmit content corresponding to the obtained situation information to the electronic device; and reproducing, upon receiving the content from the external electronic device, the received content.

In accordance with another aspect of the present disclosure, a method for an electronic device is provided. The method may include: receiving a voice command from a user; requesting, upon receiving the voice command, a first external electronic device to obtain situation information based on device information and the voice command, and transmit the obtained situation information to a second external electronic device; and reproducing, upon receiving content corresponding to the situation information from the second external electronic device, the received content.

In accordance with another aspect of the present disclosure, a computer program product (CPP) is provided. The computer program product may be included in a computer-readable storage medium and may be configured to include one or more instructions that, when executed by an electronic device, cause a processor of the electronic device to control: receiving a voice command from a user; requesting, upon receiving the voice command, a first external electronic device to obtain situation information based on device information and the voice command, and transmit the obtained situation information to a second external electronic device; and reproducing, upon receiving content corresponding to the situation information from the second external electronic device, the received content.

BRIEF DESCRIPTION OF THE DRAWINGS

FIG. 9A depicts a first scenario for recommending content by analyzing device information from a smart device according to certain embodiments of the present disclosure.

DETAILED DESCRIPTION

In a feature of the present disclosure, the electronic device can provide the user with appropriate content in real time in consideration of the user's situation information. For example, the electronic device can determine content to be provided to the user based on information regarding at least one of the on-or-off state of an external electronic appliance located near the user, the current time, or the illuminance. The electronic device may also determine a way of providing the determined content (e.g., volume, playback direction, and output device). Hence, even if the electronic device receives the same command from the user, the content to be provided to the user may vary depending on the user's situation information. In addition, by utilizing an external electronic device, there is no need for the electronic device to include all the sensors for collecting the user's situation information, so that the electronic device can be made smaller or lighter. Further, as it is not necessary to store all the device information, the situation information, and the content data in the memory of the electronic device to provide content suitable for the user, the memory resources of the electronic device can be efficiently utilized.

Figure 1:
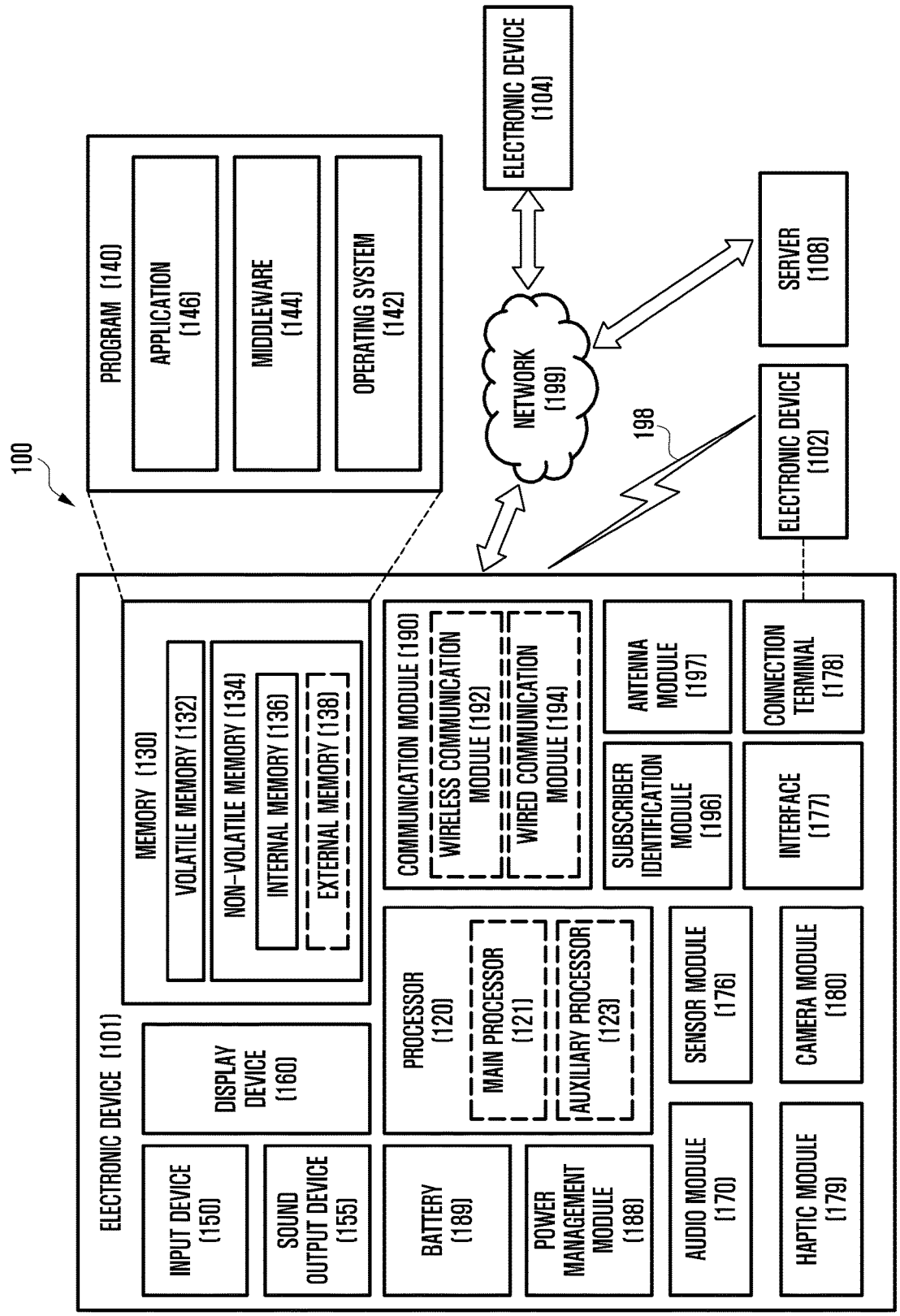
FIG. 1 illustrates electronic devices in a network environment according to certain embodiments of the present disclosure.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
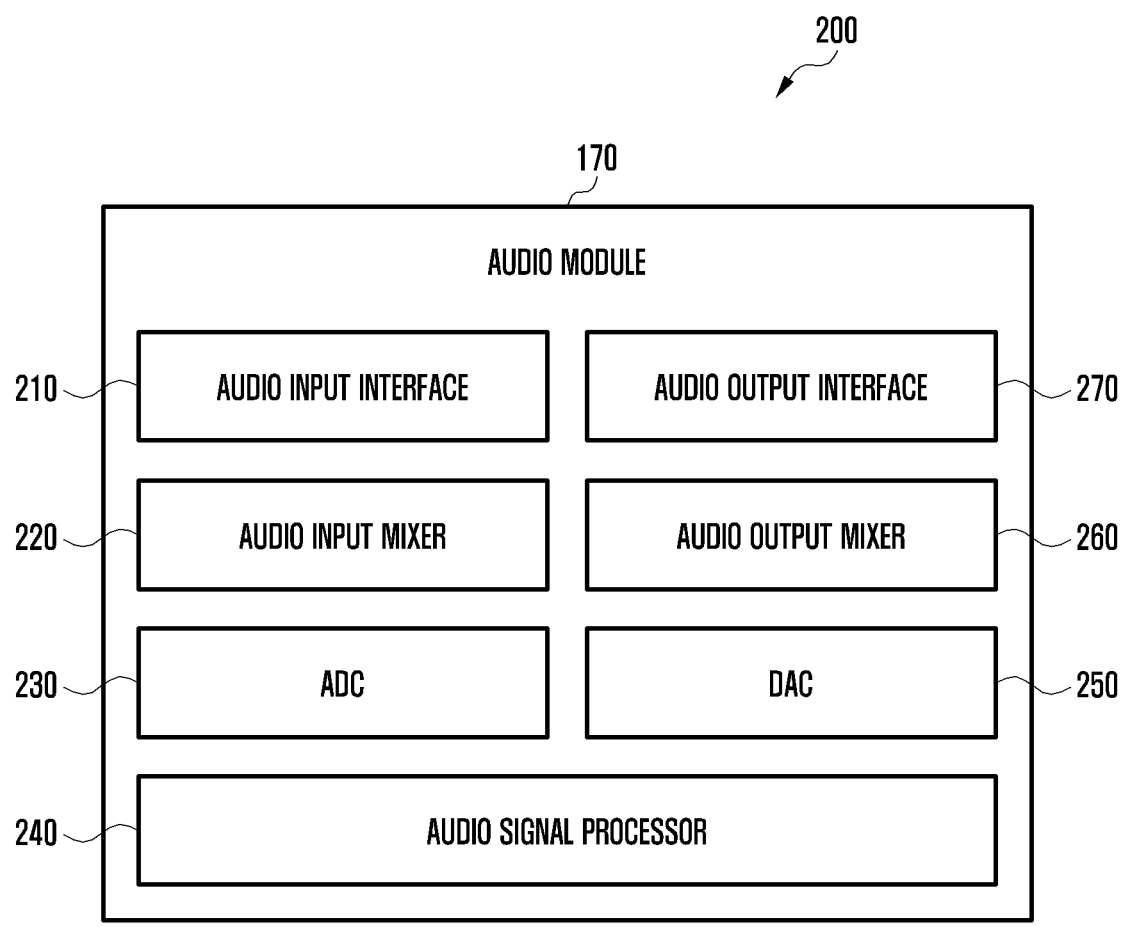
FIG. 2 is a block diagram of an audio module according to certain embodiments of the present disclosure.

FIG. 2 is a block diagram 200 illustrating the audio module 170 according to certain embodiments. Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input device 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal. The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor (120) or the memory (130)) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output device 155. The sound output device 155 may include, for example, a speaker, such as a dynamic driver or a balanced armature driver, or a receiver. According to an embodiment, the sound output device 155 may include a plurality of speakers. In such a case, the audio output interface 270 may output audio signals having a plurality of different channels (e.g., stereo channels or 5.1 channels) via at least some of the plurality of speakers.

According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240. According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 3:
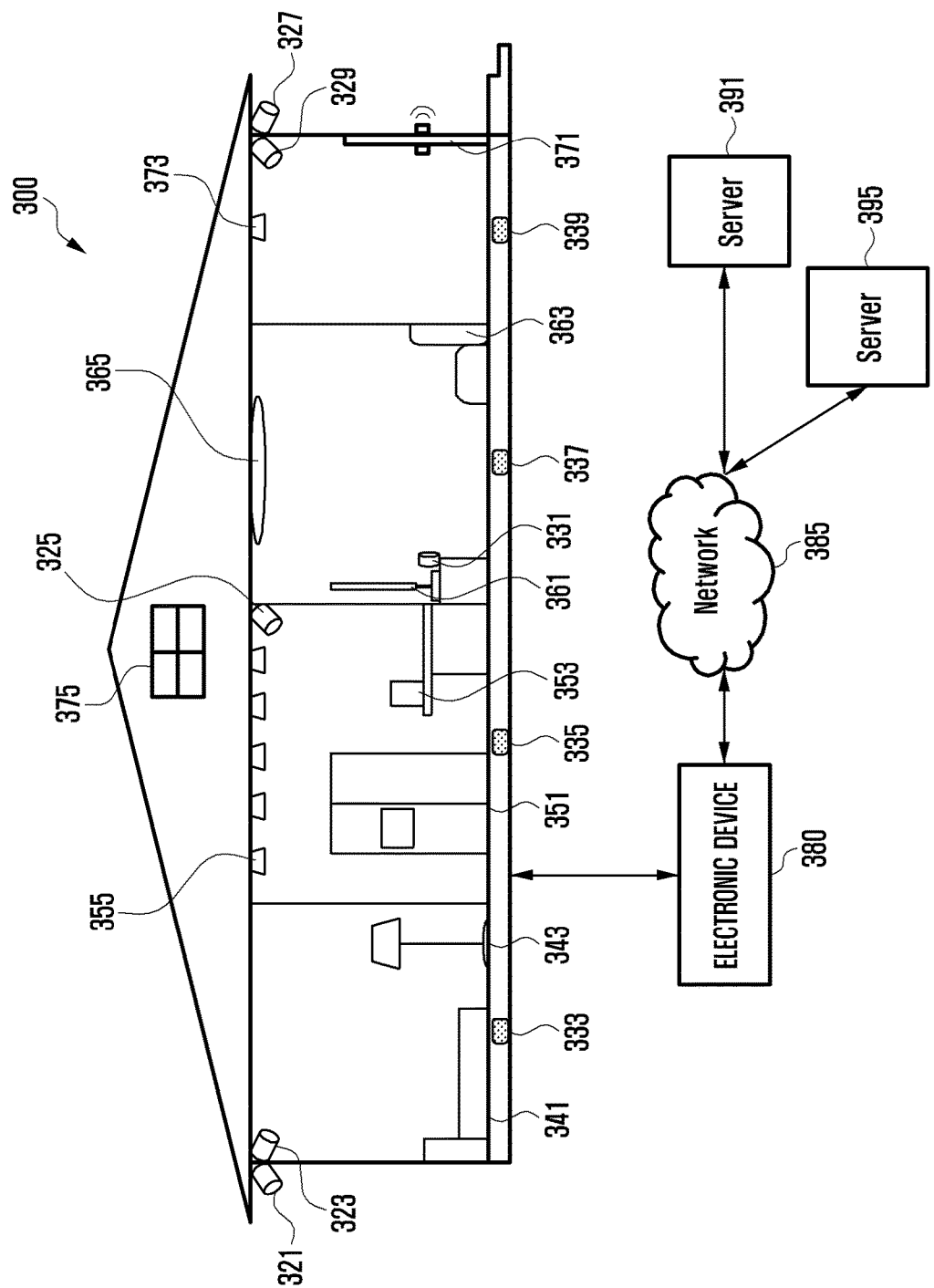
FIG. 3 illustrates a smart home environment according to certain embodiments of the present disclosure.

FIG. 3 illustrates a smart home environment 300 according to certain embodiments of the present disclosure.

In certain embodiments, the smart home environment may include one or more cameras 321, 323, 325, 327, 329 and 331, one or more sensors or devices including a sensor (e.g., floor microphones 333, 335, 337 and 339), inner room objects (e.g., bed 341 and stand 343), kitchen objects (e.g., refrigerator 351, coffee machine 353, and lights 355), living room objects (e.g., TV 361, sofa 363, and light 365), front door objects (e.g., door 371 and light 373), a window 375, an electronic device 380, a network 385, and one or more external servers 391 and 395. For example, the electronic device 380 may be, for example, an artificial intelligence speaker, or may include an electronic device that controls or cooperates with an artificial intelligence speaker.

In certain embodiments, the electronic device 380 may utilize at least one of the cameras 321 to 331 to detect where a person is located. For example, the electronic device 380 can utilize the camera 327 to detect whether a person is entering or leaving the house through the front door. The electronic device 380 can also utilize the cameras 323, 325, 329 and 331 to detect whether a person is entering, leaving, or remaining at a designated location within the house (e.g., inner room, kitchen, living room, or front door). In an embodiment, the electronic device 380 can utilize the camera 321 to detect whether a person prowling around the house, or breaking into the house. In addition, the electronic device 380 can identify the user by using at least one of the cameras 321 to 331. For example, the electronic device 380 may distinguish between a pre-designated person (e.g., resident), and an undesignated person (e.g., intruder or guest), using, for example facial recognition technology.

In certain embodiments, the electronic device 380 can identify the place where a person is located, using the floor microphones 333 to 339. For example, the electronic device 380 may determine that a person is positioned within the inner room based on a footstep sound detected by the floor microphone 333. In addition, the electronic device 380 can identify the person by comparing the characteristics (e.g., intensity, pattern, and frequency) of the footstep sound obtained by the floor microphone 333, with pre-stored characteristics of the gait of the person which may indicate an expected type, degree and quality of footstep sounds. For example, assume a family including a father, mother, and child. If the footstep sound is strong and the time interval between steps is about 1 to 2 seconds, the electronic device 380 can determine that the corresponding person is the father based on prestored information indicating the gait, weight, and step-pressure of the father. If the footstep sound is medium and the time interval between steps is about 2 to 3 seconds, the electronic device 380 can determine that the corresponding person is the mother based on information indicating the gait, weight, and step-pressure of the mother. If the footstep sound is weak and the time interval between steps is about 1 to 2 seconds, the electronic device 380 can determine that the corresponding person is the child based on prestored information indicating the gait, weight, and step-pressure of the child. The electronic device 380 can identify a person using various features such as the distance between steps, characteristics of taking a step forward from the left foot, and characteristics of taking a step forward from the right foot. For example, if footstep sounds are detected and, when compared against prestored footstep information for known users, detection of an unidentifiable gait feature may indicate that an intruder has broken into the house.

In certain embodiments, the electronic device 380 can determine the location of a person using a plurality of floor microphones. The electronic device 380 can locate the position of a person by determining the distances to the floor microphones 333, 335 and 337 via triangulation based on intensity and volume of the detected footstep sounds. For example, the electronic device 380 can determine whether a person is closer to (or approaches) the TV 361 or the sofa 363 in the living room based on a louder volume or increase volume of footstep sounds by microphones disposed near or in the living room. The electronic device 380 can determine whether a person is closer to (or approaches) the refrigerator 351 or the coffee machine 353 in the kitchen based on a louder volume or increase in volume of footstep sounds by microphones disposed near or in the kitchen. The electronic device 380 can determine the direction in which a person moves from the kitchen to the inner room or from the kitchen to the living room based on a smaller or decreasing volume of footsteps detected by microphones in the kitchen, and a louder volume or increasing volume of footstep sounds detected by microphones disposed near or in the living room. In the above description, the floor microphone is illustrated as an example, but microphones can be present at various objects. For example, microphones can be present at a variety of places such as a ceiling, a lamp, a piece of furniture, and a home appliance.

In certain embodiments, the electronic device 380 can identify the location of the user based on information received from various objects such as the bed 341, the stand 343, the refrigerator 351, the coffee machine 353, the TV 361, and the sofa 363.

In certain embodiments, the bed 341 or the sofa 363 may include a motion sensor, a weight sensor, an acceleration sensor, a capacitance sensor, or a pressure sensor. The stand 343 may include a motion sensor, and may provide on-or-off information. The refrigerator 351 may include a motion sensor, a camera, a door open sensor, an acceleration sensor, and the like. The refrigerator 351 can provide inventory information including food items disposed within, and food items that have been removed, and further information indicating whether the door is open or closed. The coffee machine 353 can include a motion sensor, provide on-or-off information, and provide information on types of coffee that have been dispensed. The lights 355, 365 and 373 may each include a motion sensor, and may provide on-or-off information. The TV 361 can include a motion sensor, a camera, and a microphone, provide on-or-off information, and can provide information about content that is being or has been displayed on the TV 361. The door 371 may include a motion sensor, an acceleration sensor, a door open sensor, a biometric information sensor and the like, may provide information related to the opening and closing of the door, information indicating persons who are entering and exiting through the door 371, and information about the pressure applied to the door, which may indicate attempts to forcibly open the door. The window 375 may have a similar structure and function as those of the door 371.

In certain embodiments, devices including one or more sensors may further include a wireless communication unit, and may receive a radio signal from a portable electronic device of the user (e.g., cell phone or smart bracelet) and provide information thereon.

In certain embodiments, the electronic device 380 can utilize the various provided information to determine the location of the user and an identity of the user. The electronic device 380 can utilize various provided information and the server 391 to determine the location of the user and identify the user. The electronic device 380 can transfer (e.g., transmits) various provided information to the server 391.

In certain embodiments, the electronic device 380 can determine the settings of a sensor based on additional information related to an electronic appliance in operation, the current time, and the user's life pattern. For example, if there is a user located in the inner room, and the light therein is presently deactivated (e.g., off), and the user is determined via the bed sensor to be lying on the bed for at least a prespecified time period, the electronic device 380 may determine that the user is sleeping. The electronic device 380 may accordingly set the sensor to a sleep configuration (e.g., executing a check for a user's presence according to a regular interval, such as once every 20 minutes in the early evening, and once every 5 minutes in the early morning).

In certain embodiments, the electronic device 380 may select the sensor to be activated, from among the sensors associated with the inner room. The electronic device 380 can selected the sensor to be operated based on additional information related to an electronic appliance in operation, the current time, and the user's life pattern. For example, the electronic device 380 can apply the sleep configuration to the kitchen and the living room. When the sleep configuration is set, the living room and the kitchen can be set to a monitoring configuration, and one of either the camera and the motion sensor can be operated.

In certain embodiments, the electronic device 380 may include a portable terminal, a tablet computer, or a wearable device of the user. The electronic device 380 may also be included in various electronic appliances such as a TV, a refrigerator, a set-top box, and a game console. Although the electronic device 380 has been described as a separate entity for ease of description, the functions of the electronic device 380 may be supported by one or more of various objects or electronic appliances.

FIG. 3 illustrates the operation of an electronic device (e.g., an artificial intelligence speaker) in a smart home environment. However, this is not limited to a smart home but may be applied in various environments (e.g., in the interior or for an exterior of a building). The electronic device described as an artificial intelligence speaker may be one of various electronic devices with or without an artificial intelligence feature. The servers 391 and 395 in FIG. 3 may correspond to the server 108 in FIG. 1, and the network 385 may correspond to the second network 199 of FIG. 1.

Figure 4:
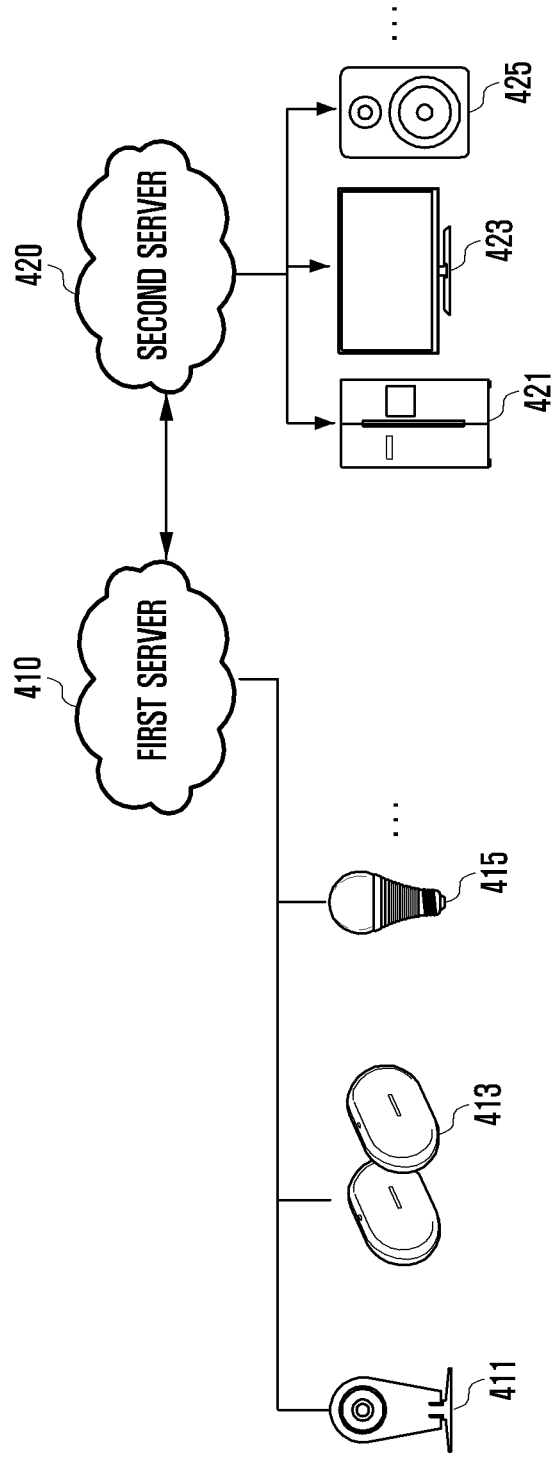
FIG. 4 illustrates a content providing system that obtains device information from smart devices, extracts situation information of the user based on the device information, and provides the user with content corresponding to the situation information according to certain embodiments of the present disclosure.

FIG. 4 illustrates a content providing system that obtains device information (or "things" information) from smart devices, extracts situation information of the user based on the device information, and provides the user with content corresponding to the situation information according to certain embodiments of the present disclosure.

The device information may include information pertinent to electronic appliances included in the smart home environment, such as an on or off state, a sound level, a brightness level, an intensity level, and arrangement relative to other devices, in addition to information pertinent to operation of those devices including user identification, user location, a current time, and an environmental illumination level, environmental sounds, etc.

In certain embodiments, the content providing system may include a first server 410, a second server 420, smart devices 411, 413 and 415, and content output devices 421, 423 and 425.

In certain embodiments, the first server 410 may obtain device information from the smart devices 411, 413 and 415, and analyze the obtained device information to extract the situation information of the user. The second server 420 can receive the situation information of the user from the first server 410 and determine the content to be provided to the user based on the received situation information. The second server 420 may transmit the determined content to the content output devices 421, 423 and 425 for content output. Here, the first server 410 and the second server 420 are not necessarily separated from each other, and the first server 410 and the second server 420 may be integrated into one server. Specific embodiments for providing content according to the situation information will be described in more detail with reference to the following drawings.

In certain embodiments, the smart devices may include a camera 411, a speaker 413, and a light 415. For example, the camera 411 can identify the user and can provide the first server 410 with device information for tracking the location of the user. The speaker 413 can provide the first server 410 with device information related to the speaker's position, specification, and volume. The light 415 can provide the first server 410 with device information related to the light's on or off state, color, and brightness.

In certain embodiments, the content output devices may include a refrigerator 421, a TV 423, and a speaker 425. For example, the content output device can provide a streaming service by receiving content from the second server 420 and reproducing it in real time. Alternatively, the content output device may receive information about the content to be played back (e.g., play list) from the second server 420, and reproduce at least one content matching the play list among the pieces of content stored in the content output device.

Figure 5:
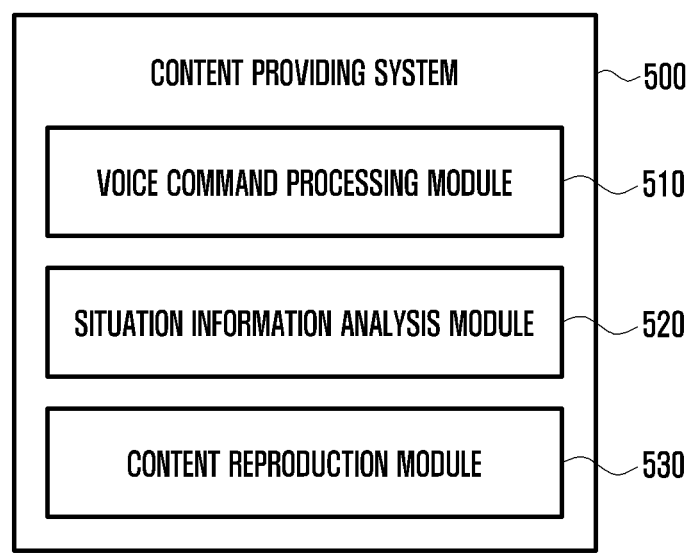
FIG. 5 is a schematic block diagram of the content providing system according to certain embodiments of the present disclosure.

FIG. 5 is a schematic block diagram of the content providing system according to certain embodiments of the present disclosure.

In certain embodiments, the content providing system 500 may include a voice command processing module 510, a situation information analysis module 520, and a content reproduction module 530. In other words, the content providing system 500 may be a system that receives a voice command from the user, analyzes situation information related to the user, and provides a suitable piece of content to the user.

In certain embodiments, the voice command processing module 510 may receive a voice command from the user and process the voice command to enable the electronic device 380 to perform operations consistent with the user's intention. For example, the voice command processing module 510 may receive a voice command "play music" from the user and generate a signal that causes the electronic device 380 to play music.

In certain embodiments, the situation information analysis module 520 may analyze the situation information of the user. More specifically, the situation information analysis module 520 can obtain at least one piece of device information from a variety of electronic appliances, sensors, and objects included in the smart home environment 300. For example, the device information may include information regarding electronic appliances included in the smart home environment (e.g. on or off state, sound level, brightness level, intensity level, and arrangement), user identification, time, and illumination. The situation information analysis module 520 can analyze a voice command from the user and the device information to extract situation information of the user. For example, if the intensity of illumination is high and the coffee machine is turned on at 7 A.M., the situation information analysis module 520 can extract situation information that the user has awoken, and intends to drink a cup of coffee, based on the intensity of illumination and the activation state of the coffee machine. Thereafter, the situation information analysis module 520 can transmit the situation information to the content reproduction module 530, which may then reproduce content corresponding to the morning coffee theme.

In certain embodiments, the content reproduction module 530 can determine the content (e.g., a particular program, music, media, television show, movie, etc.) matching the identified situation information of the user and reproduce the determined content. The content reproduction module 530 can reproduce the content determined to be suitable for the user among the pieces of content stored in the electronic device 380, or can receive content data from the server 391 or 395 for content reproduction.

In certain embodiments, when the content reproduction module 530 receives a music reproduction command from the user and obtains situation information such as electronic appliance information (e.g., coffee machine on, TV off, and light off), time information (e.g., 7 A.M.), and illumination information (e.g., bright), it can reproduce a piece of content pre-associated with a known categorical theme, such as "morning coffee". Accordingly, a plurality of themes reflecting activities of a user can be stored in association with media content, and also with device and sensor-detected environmental information, such as illumination, activation/deactivation-states of smart devices, a present time, weather, etc.

In certain embodiments, the content reproduction module 530 may determine a configuration for reproducing the content to be provided to the user. For example, the content reproduction module 530 may reproduce the content at an increased volume upon obtaining specific electronic appliance information (e.g., a vacuum is active with a high power setting, requiring a louder volume from the television).

In certain embodiments, the content reproduction module 530 may control at least one content output device (e.g., refrigerator 421, TV 423, and speaker 425 in FIG. 4) to play back content based on the location of the user. For example, when the user remains in the bedroom, the content reproduction module 530 can control the content output device disposed in the bedroom (e.g., speaker 425) to reproduce content. For example, when the user moves from the bedroom to the living room, the content reproduction module 530 may control the content output device (e.g., speaker 425) disposed in the bedroom to stop content reproduction, and may control the content output device (e.g., TV 423) disposed in the living room to initiate reproducing content. In addition, when a plurality of content output devices are arranged in a space where the user is located, the content reproduction module 530 can control the content output device in closer proximity to the user to reproduce content. For example, when there are a plurality of content output devices arranged in a space where the user is located, the content reproduction module 530 may selectively configure a left content output device and a right content output device, with respect to the user. Thereby, the content reproduction module 530 can implement a stereo audio system using two devices disposed to a left and right of the user, from among a plurality of content output devices.

In certain embodiments, the content providing system 500 may include at least one of the electronic device 380 (e.g., electronic device 101 in FIG. 1), the first server 391 (e.g., server 108 in FIG. 1), or the second server 395 (e.g., server 108 in FIG. 1). Hence, the operations of the voice command processing module 510, the situation information analysis module 520, or the content reproduction module 530 of the content providing system 500 may be performed in cooperation between the electronic device 380, the first server 391, and the second server 395. The operations of the content providing system 500 may also be performed by one of the electronic device 380, the first server 391, and the second server 395.

Figure 6:
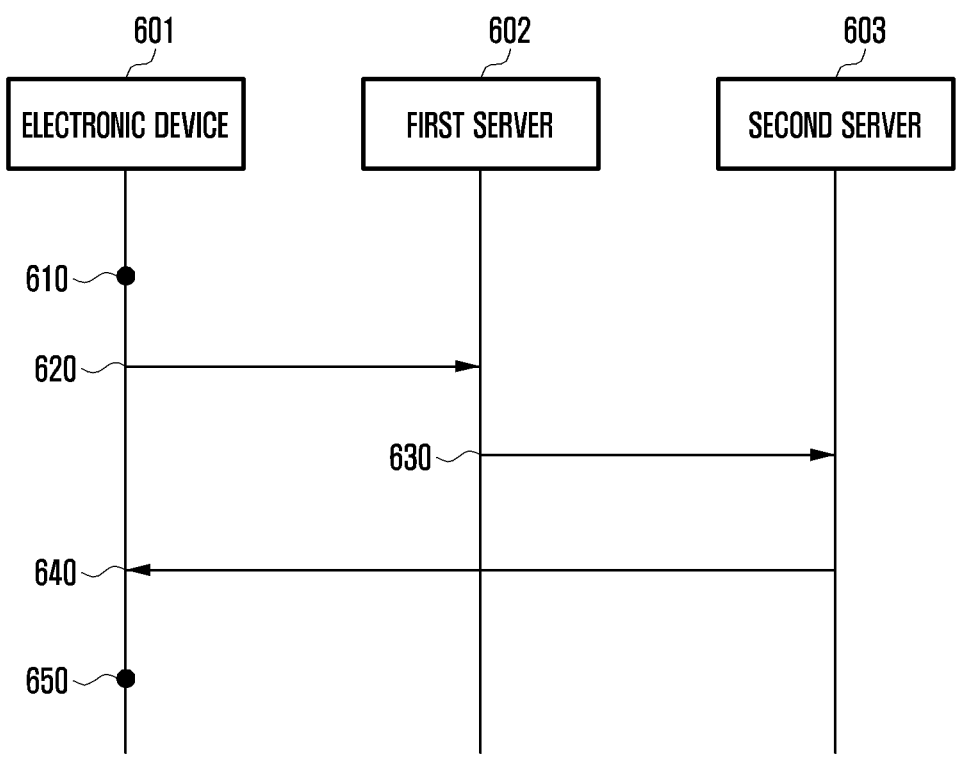
FIG. 6 is a sequence diagram depicting a first method that determines content based on a voice command and situation information of the user and plays the determined content according to certain embodiments of the present disclosure.

FIG. 6 is a sequence diagram depicting a first method that determines content based on a voice command and situation information of the user and plays the determined content according to certain embodiments of the present disclosure.

In certain embodiments, at operation 610, the electronic device 601 may receive a voice command from the user. For example, the electronic device 601 may receive a voice command from the user via an input unit (e.g., input device 150 in FIG. 1, or microphone).

In certain embodiments, at operation 620, the electronic device 601 may transmit information about the user's voice command (e.g., "play music", or "play movie") to the first server 602. Here, the first server 602 may be a cloud server (e.g., Samsung cloud) associated with the electronic device 601 (e.g., AI speaker), and it may obtain device information from Internet of Things (IoT) devices or other devices located in a specific space (e.g., home, or office) and may update the existing device information. For example, the device information may include information regarding electronic appliances included in the smart home environment (e.g. on or off state, sound level, brightness level, intensity level, and arrangement), user identification, user location, time, and illumination.

In certain embodiments, upon receiving the voice command information, the first server 602 may obtain situation information of the user. Specifically, the first server 602 can obtain device information from at least one smart device disposed in a space where the user is located and can analyze the obtained device information to extract the situation information of the user. For example, if the intensity of illumination is high and the coffee machine is turned on at 7 A.M., the first server 602 can extract situation information that the user wants to drink a cup of coffee in the morning.

In certain embodiments, at operation 630, the first server 602 may transmit the situation information of the user to the second server 603. Here, the situation information of the user may be a combination of the voice command from the user and the device information from the smart devices. For example, the situation information may indicate that the user wants to play music and desires to drink a cup of coffee in the morning. As another example, the situation information of the user may be information obtained by analyzing device information from smart devices, regardless of a voice command from the user. In this case, the first server 602 may send the second server 603 both the user's situation information (e.g., the user wishes to drink a cup of coffee in the morning) and the information about the user's voice command (e.g., the user wants to play music). Meanwhile, the second server 603 may be a content providing server that stores one or more pieces of content available to the user. For example, the second server 603 can store pieces of digital content such as songs, movies, games, broadcasts, and radio programs and provide a piece of content matching the user's situation information.

In certain embodiments, at operation 640, the second server 603 may determine the content to be provided to the user based on the situation information, and transmit the determined content to the electronic device 601. For example, based on the user's situation information received from the first server 602, the second server 603 may determine that the user wishes to listen to music while drinking coffee in the morning. Then, the second server 603 can determine at least one piece of music content corresponding to the morning coffee theme and can transmit the determined piece of music content to the electronic device 601. Alternatively, the second server 603 may transmit a content list to the electronic device 601, so that the electronic device 601 may reproduce content included in the content list among the pieces of stored content.

In certain embodiments, at operation 650, the electronic device 601 may reproduce the content received from the second server 603. Alternatively, the electronic device 601 may receive a content list from the second server 603 and reproduce content included in the content list among the pieces of stored content.

Figure 7:
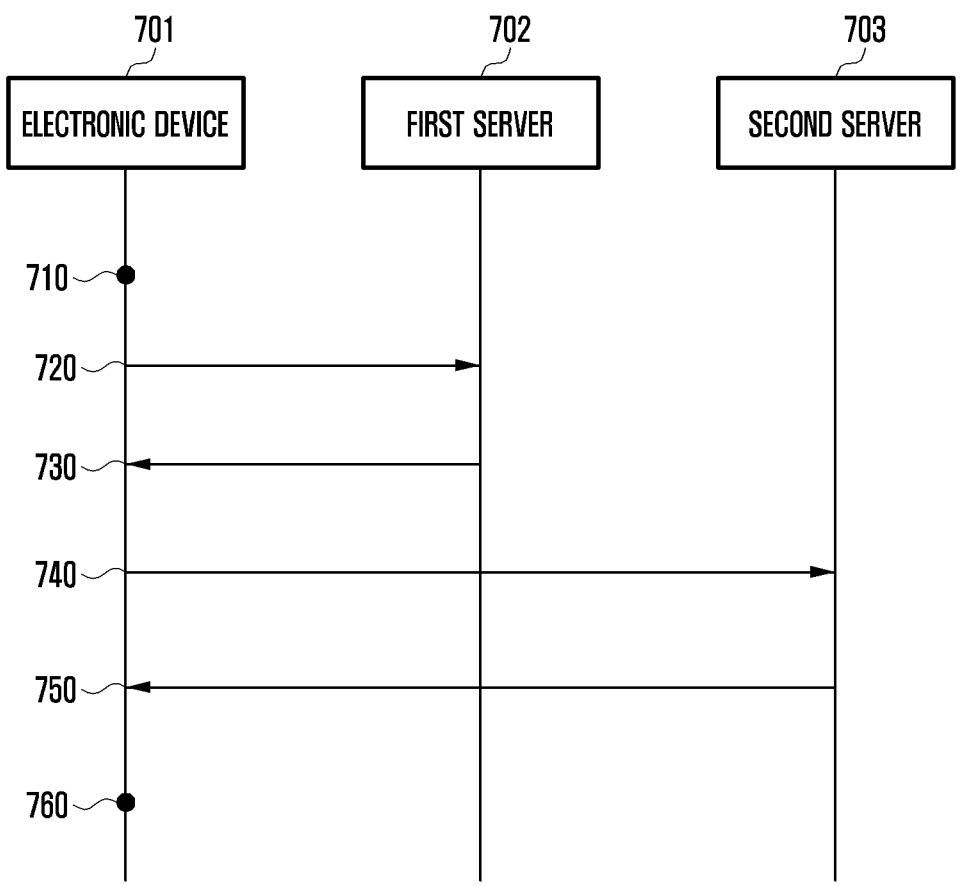
FIG. 7 is a sequence diagram depicting a second method that determines content based on a voice command and situation information of the user and plays the determined content according to certain embodiments of the present disclosure.

FIG. 7 is a sequence diagram depicting a second method that determines content based on a voice command and situation information of the user and plays the determined content according to certain embodiments of the present disclosure.

In certain embodiments, at operation 710, the electronic device 701 may receive a voice command from the user. For example, the electronic device 701 may receive a voice command (e.g., "play music", or "play movie") from the user via an input unit (e.g., input device 150 in FIG. 1, or microphone).

In certain embodiments, at operation 720, the electronic device 701 may send a request for device information to the first server 702. Here, the first server 702 may be a cloud server (e.g., Samsung cloud) associated with the electronic device 701 (e.g., AI speaker), and it may obtain device information from IoT devices or other devices located in a specific space (e.g., home, or office) and may update the existing device information.

In certain embodiments, at operation 730, the first server 702 may transmit device information to the electronic device 701. For example, the device information may include information regarding electronic appliances included in the smart home environment (e.g., an on or off state, a sound level, a brightness level, an intensity level, and an arrangement of the devices within the space), user identification, user location, time, and illumination.

In certain embodiments, the electronic device 701 may obtain the user's situation information based on the voice command from the user and the device information received from the first server 702. For example, based on the voice command (e.g., "play music") that is received from the user and the device information received from the first server (e.g., 7 A.M., high illuminance, coffee machine on), the electronic device 701 can obtain the situation information, indicating that the user wishes to listen to music while drinking coffee in the morning. At operation 740, the electronic device 701 may transmit the situation information of the user to the second server 703. Alternatively, as the user's situation information may not reflect the user's voice command (e.g., the user wants to have coffee in the morning), the electronic device 701 may transmit both the user's situation information and the user's voice command (e.g., play music) to the second server 703 at operation 740. In the following operation, it is assumed that the situation information is obtained by reflecting the voice command from the user.

In certain embodiments, at operation 750, the second server 703 may determine (e.g., select) content to be provided to the user based on the situation information and transmit the determined content to the electronic device 701. For example, based on the user's situation information received from the first server 702, the second server 703 may detect that the user wishes to listen to music while drinking coffee in the morning. Then, the second server 703 can select at least one piece of music content corresponding to a prestored morning coffee theme, and transmit the determined piece of music content to the electronic device 701. That is, a plurality of themes reflecting activities of a user can be stored in association with media content, and also with device and sensor-detected environmental information, such as illumination, activation/deactivation-states of smart devices, a present time, weather, etc. Alternatively, the second server 703 may transmit a content list (e.g., a music playlist) to the electronic device 701, so that the electronic device 701 may reproduce content included in the content list among the pieces of stored content (e.g., selecting a song from the music playlist).

In certain embodiments, at operation 760, the electronic device 701 may reproduce the content received from the second server 703. Alternatively, the electronic device 701 may receive a content list from the second server 703 and reproduce content included in the content list among the pieces of stored content.

Figure 8:
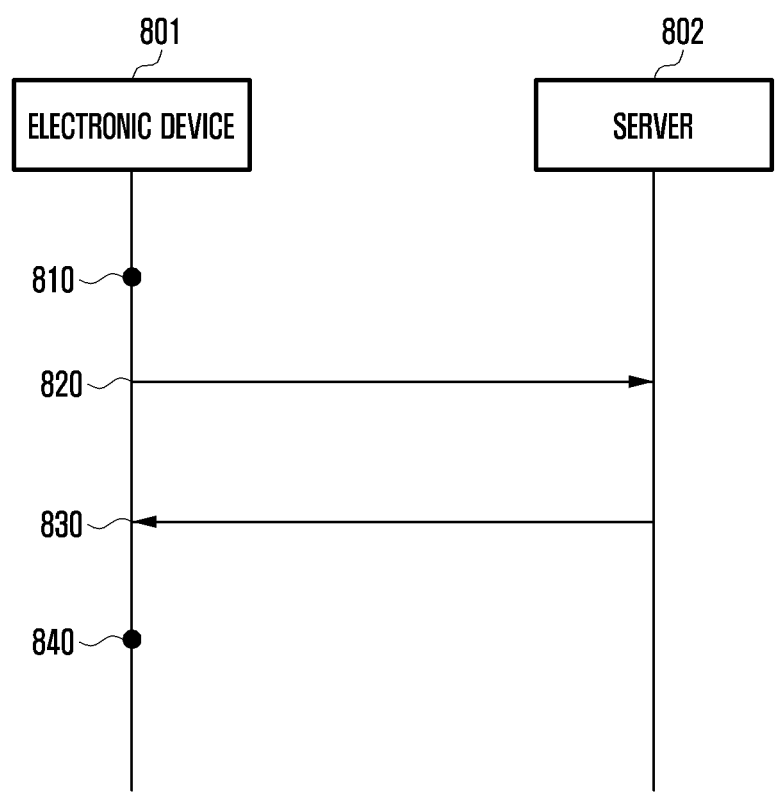
FIG. 8 is a sequence diagram depicting a third method that determines content based on a voice command and situation information of the user and plays the determined content according to certain embodiments of the present disclosure.

FIG. 8 is a sequence diagram depicting a third method that determines content based on a voice command and situation information of the user and plays the determined content according to certain embodiments of the present disclosure. Unlike the method of FIG. 6 or FIG. 7, the method of FIG. 8 may provide content to the user through a single server 802 rather than plural servers. Hence, the server 802 can check the situation information of the user and provide the electronic device 801 with content corresponding to the situation information.

In certain embodiments, at operation 810, the electronic device 801 may receive a voice command from the user. For example, the electronic device 801 may receive a voice command (e.g., "play music", or "play movie") from the user via an input unit (e.g., input device 150 in FIG. 1, or microphone).

In certain embodiments, at operation 820, the electronic device 801 may transmit information corresponding to the user's voice command (e.g., "play music", or "play movie") to the server 802.

In certain embodiments, at operation 830, the server 802 may identify situation information of the user based on the voice command of the user (e.g., the user intends to play media) and the device information stored therein, and may determine (e.g., select) the content to be provided to the user based on the situation information.

In certain embodiments, the server 802 may be a cloud server (e.g., Samsung cloud) associated with the electronic device 801 (e.g., AI speaker), and it may obtain device information from IoT devices or other devices located in a specific space (e.g., home, or office) and may update the existing device information. For example, the device information may include information regarding electronic appliances included in the smart home environment (e.g. on or off state, sound level, brightness level, intensity level, and arrangement), user identification, user location, time, and illumination.

In certain embodiments, the server 802 can store pieces of digital content such as songs, movies, games, broadcasts, and radio programs, and can function as a content providing server that provides a piece of content matching the user's situation information.

In certain embodiments, at operation 830, the server 802 may transmit the selected/determined content to the electronic device 801. For example, based on the voice command of the user and the device information stored in the server 802, the server 802 may identify the situation information that the user wants to listen to music while drinking coffee in the morning. Then, the server 802 may determine at least one piece of music content corresponding to the morning coffee theme and may transmit the determined piece of music content to the electronic device 801. Alternatively, the server 802 may transmit a content list to the electronic device 801, so that the electronic device 801 may reproduce content included in the content list among the pieces of stored content.

In certain embodiments, at operation 840, the electronic device 801 may reproduce the content received from the server 802. Alternatively, the electronic device 801 may receive a content list from the server 802 and reproduce content included in the content list among the pieces of stored content.

FIG. 9A depicts a first scenario for recommending content by analyzing device information from a smart device according to certain embodiments of the present disclosure.

In certain embodiments, the electronic device (e.g., electronic device 380 in FIG. 3) may be an artificial intelligence speaker. The electronic device 380 may receive a command "play music" from the user (910). Here, the command may not necessarily be a voice sound having a specific meaning. For example, the electronic device 380 can sense a preset sound such as an applause or a whistle as a command. As another example, the electronic device 380 may sense reception of a button or key input from a remote controller as a command.

In certain embodiments, upon receiving a command "play music" from the user, the electronic device 380 may obtain device information from at least one smart device located in a particular space (e.g., home, or office) where the electronic device 380 is located (920). For example, the electronic device 380 may obtain device information such as "the user is in the bedroom", "the light is off", time information, and speaker (talker) information. Based on the device information and the user's voice command, the electronic device 380 may extract situation information that the user wants to listen to quiet music or listen to music inducing sleep in the bedroom. Then, the electronic device 380 may receive content corresponding to the situation information from the server (e.g., server 395 in FIG. 3) and provide it to the user (930). Alternatively, the electronic device 380 may receive a content list corresponding to the situation information from the server (e.g., server 395 in FIG. 3) and provide the user with content matching the content list among the pieces of stored content (930). For example, the electronic device 380 may provide the user with a white noise sound or a sleep inducing sound (930).

In certain embodiments, upon receiving a command "play music" from the user, the electronic device 380 may request the server (e.g., server 391 in FIG. 3) to obtain device information from at least one smart device located in a particular space (e.g., home, or office) (920). For example, the server 391 may obtain device information such as "the user is in the bedroom", "the light is off", time information, and speaker (talker) information. Based on the device information and the user's voice command, the server 391 may extract situation information that the user wants to listen to quiet music or listen to music inducing sleep in the bedroom. Then, the server 391 may request another server (e.g., server 395 in FIG. 3) to transmit content matching the situation information to the electronic device 380. Thereafter, the electronic device 380 may provide the received content to the user (930). Alternatively, the server 391 may request the server 395 to transmit a content list matching the situation information to the electronic device 380. Thereafter, the electronic device 380 may provide the user with content matching the content list among the pieces of stored content (930). For example, the electronic device 380 may provide the user with a white noise sound or a sleep inducing sound (930).

Figure 9B:
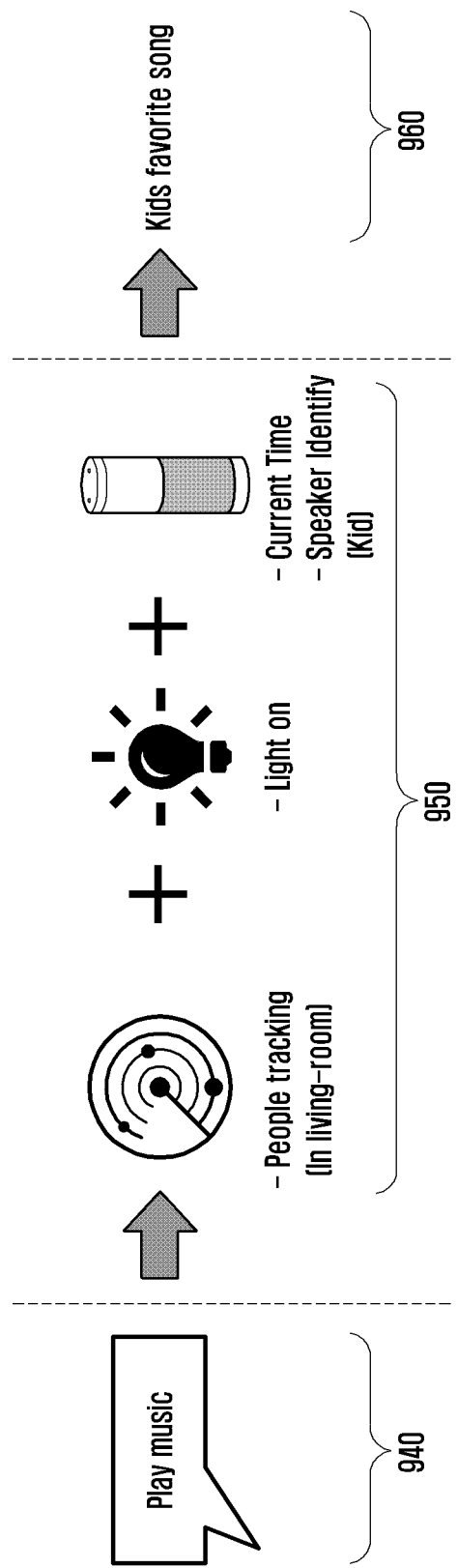
FIG. 9B depicts a second scenario for recommending content by analyzing device information from a smart device according to certain embodiments of the present disclosure.

FIG. 9B depicts a second scenario for recommending content by analyzing device information from a smart device according to certain embodiments of the present disclosure.

In certain embodiments, the electronic device (e.g., electronic device 380 in FIG. 3) may be an artificial intelligence speaker. The electronic device 380 may receive a command "play music" from the user (940). Here, the command may not necessarily be a voice sound having a specific meaning. For example, the electronic device 380 can sense a preset sound such as an applause or a whistle as a command. As another example, the electronic device 380 may sense reception of a button or key input from a remote controller as a command.

In certain embodiments, upon receiving a command "play music" from the user, the electronic device 380 may obtain device information from at least one smart device located in a particular space (e.g., home, or office) where the electronic device 380 is located (950). For example, the electronic device 380 may obtain device information such as "the user is in the living room", "the light is on", time information, and speaker information (e.g., kid). Based on the device information and the user's voice command, the electronic device 380 may extract situation information that the user is a kid and wants to listen to music in the living room. Then, the electronic device 380 may receive content corresponding to the situation information from the server (e.g., server 395 in FIG. 3) and provide it to the user (960). Alternatively, the electronic device 380 may receive a content list corresponding to the situation information from the server (e.g., server 395 in FIG. 3) and provide the user with content matching the content list among the pieces of stored content (960). For example, the electronic device 380 may provide the user with a "kid's" favorite song (960).

In certain embodiments, upon receiving a command "play music" from the user, the electronic device 380 may request the server (e.g., server 391 in FIG. 3) to obtain device information from at least one smart device located in a particular space (e.g., home, or office) (950). For example, the server 391 may obtain device information such as "the user is in the living room", "the light is on", time information, and speaker information (e.g., kid). Based on the device information and the user's voice command, the electronic device 380 may extract situation information that the user is a kid and wants to listen to music in the living room. Then, the server 391 may request another server (e.g., server 395 in FIG. 3) to transmit content matching the situation information to the electronic device 380. Thereafter, the electronic device 380 may provide the received content to the user (950). Alternatively, the server 391 may request the server 395 to transmit a content list matching the situation information to the electronic device 380. Thereafter, the electronic device 380 may provide the user with content matching the content list among the pieces of stored content (960). For example, the electronic device 380 may provide the user with a "kid's" favorite song (960).

Figure 9C:
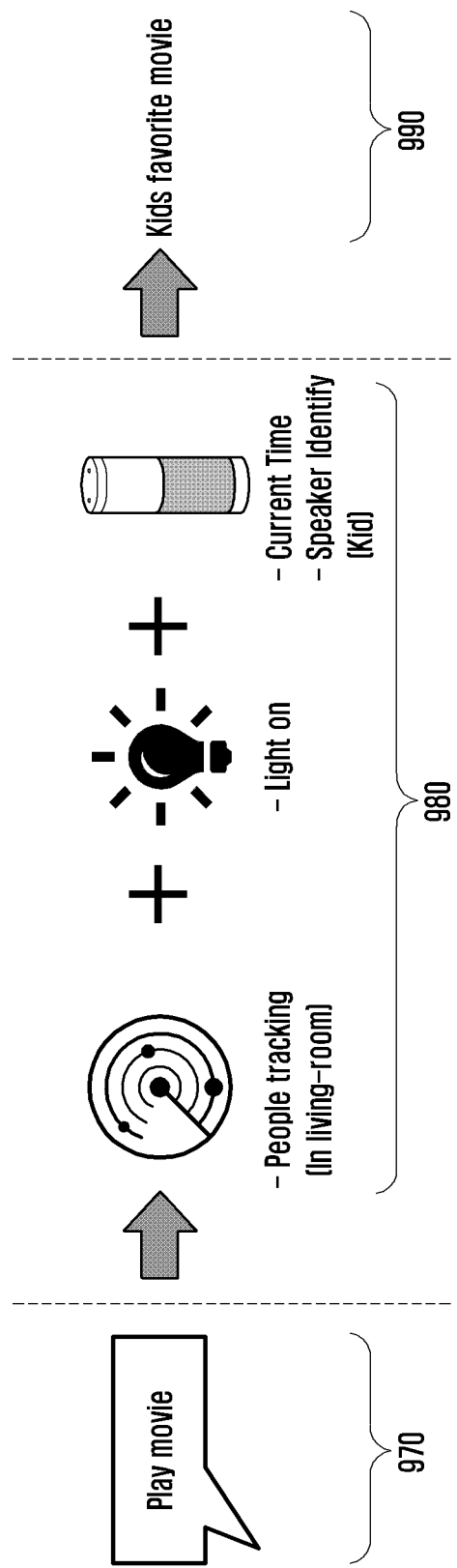
FIG. 9C depicts a third scenario for recommending content by analyzing device information from a smart device according to certain embodiments of the present disclosure.

FIG. 9C depicts a third scenario for recommending content by analyzing device information from a smart device according to certain embodiments of the present disclosure.

In certain embodiments, the electronic device (e.g., electronic device 380 in FIG. 3) may be an artificial intelligence speaker. The electronic device 380 may receive a command "play video" from the user (970). Here, the command may not necessarily be a voice sound having a specific meaning. For example, the electronic device 380 can sense a preset sound such as an applause or a whistle as a command. As another example, the electronic device 380 may sense reception of a button or key input from a remote controller as a command.

In certain embodiments, upon receiving a command "play movie" from the user, the electronic device 380 may obtain device information from at least one smart device located in a particular space (e.g., home, or office) where the electronic device 380 is located (980). For example, the electronic device 380 may obtain device information such as "the user is in the living room", "the light is on", time information, and speaker information (e.g., kid). Based on the device information and the user's voice command, the electronic device 380 may extract situation information that the user is a kid and wants to view a movie in the living room. Then, the electronic device 380 may receive content corresponding to the situation information from the server (e.g., server 395 in FIG. 3) and provide it to the user (990). Alternatively, the electronic device 380 may receive a content list corresponding to the situation information from the server (e.g., server 395 in FIG. 3) and provide the user with content matching the content list among the pieces of stored content (990). For example, the electronic device 380 may provide the user with a kids favorite movie (990). Meanwhile, if the electronic device 380 is an artificial intelligence speaker, as it may be not sufficient to reproduce a movie, the electronic device 380 may control an electronic appliance (e.g., TV 423 in FIG. 4) located in the living room where the user remains to play the movie. In this case, the electronic device 380 may operate as a smart hub device in a specific space where the user is located.

In certain embodiments, upon receiving a command "play movie" from the user, the electronic device 380 may request the server (e.g., server 391 in FIG. 3) to obtain device information from at least one smart device located in a particular space (e.g., home, or office) (980). For example, the server 391 may obtain device information such as "the user is in the living room", "the light is on", time information, and speaker information (e.g., kid). Based on the device information and the user's voice command, the server 391 may extract situation information that the user is a kid and wants to view a movie in the living room. Then, the server 391 may request another server (e.g., server 395 in FIG. 3) to transmit content matching the situation information to the electronic device 380. Thereafter, the electronic device 380 may provide the received content to the user (990). Alternatively, the server 391 may request the server 395 to transmit a content list matching the situation information to the electronic device 380. Thereafter, the electronic device 380 may provide the user with content matching the content list among the pieces of stored content (990). For example, the electronic device 380 may provide the user with a kid's favorite movie (990). Meanwhile, if the electronic device 380 is an artificial intelligence speaker, as it may be not sufficient to reproduce a movie, the electronic device 380 may control an electronic appliance (e.g., TV 423 in FIG. 4) located in the living room where the user remains to play the movie. In this case, the electronic device 380 may operate as a smart hub device in a specific space where the user is located.

Figure 10:
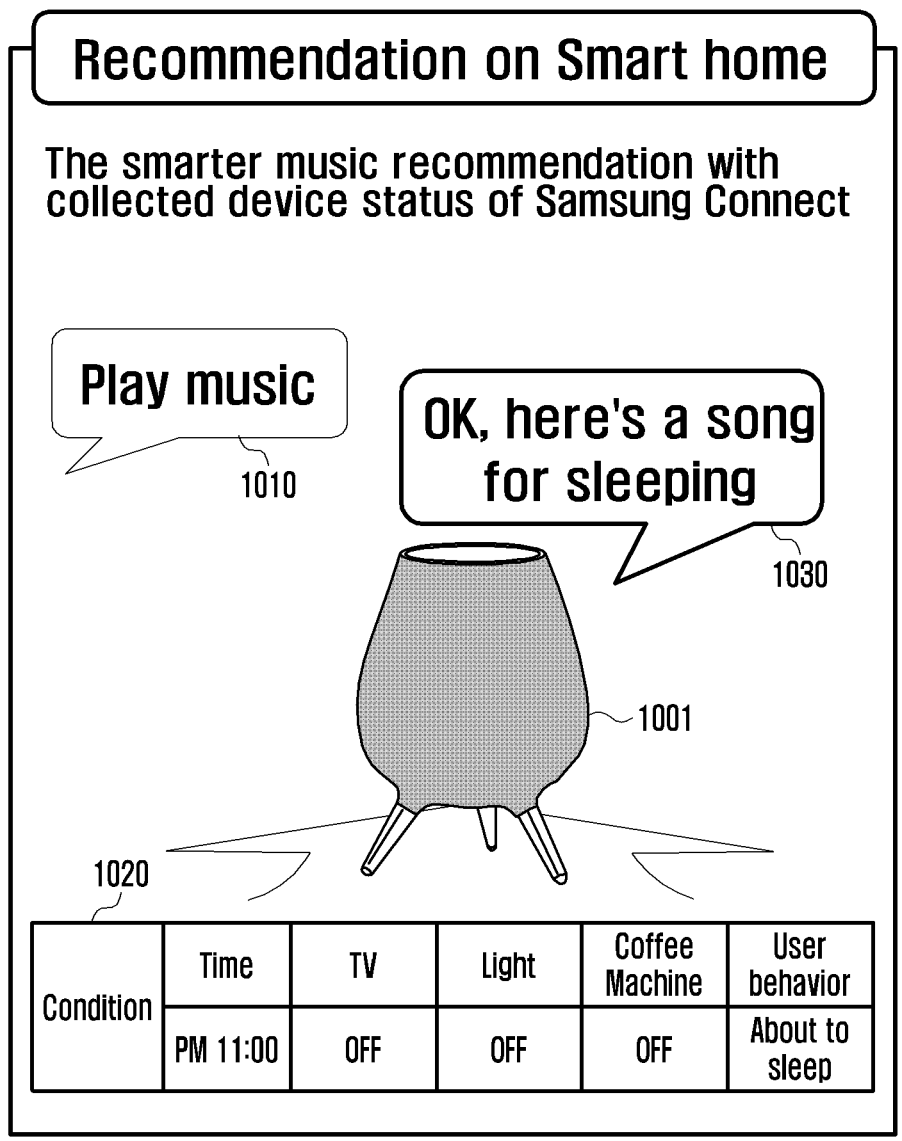
FIG. 10 depicts a method that obtains device information from smart devices based on a voice command of the user, extracts situation information of the user based on the device information, and provides the user with content corresponding to the situation information according to certain embodiments of the present disclosure.

FIG. 10 depicts a method that obtains device information from smart devices based on a voice command of the user, extracts situation information of the user based on the device information, and provides the user with content corresponding to the situation information according to certain embodiments of the present disclosure.

In certain embodiments, the electronic device 1001 (e.g., AI speaker) can operate as a smart hub device in the smart home system. The electronic device 1001 may receive a request "play music" from the user (1010) and check situation information in response to the request (1020). For example, to obtain the situation information, the electronic device 1001 may obtain device information directly from the smart devices in the smart home system. Alternatively, to obtain the situation information, the electronic device 1001 may obtain device information associated with the smart devices in the smart home system from a cloud server (e.g., Samsung cloud). The electronic device 1001 can obtain device information such as "the current time is 11:00 P.M.", "the TV is off", "the light is off", and "the coffee machine is off". The electronic device 1001 may analyze the obtained device information and the voice command of the user to thereby extract the situation information that the user wants to listen to sleep inducing music (1020). Then, the electronic device 1001 may provide the user with a piece of music with a good sleep theme (1030).

According to certain embodiments, an electronic device may include: an audio module; a communication module; a microphone; a memory; and a processor. The processor may be configured to control: receiving a voice command from the user via the microphone; requesting, upon receiving the voice command, a first external electronic device to obtain situation information based on device information and the voice command, and transmit the obtained situation information to a second external electronic device; and reproducing, upon receiving content corresponding to the situation information from the second external electronic device, the received content.

The device information may include information obtained from at least one electronic appliance disposed in a specific space where the electronic device is located, and the at least one electronic appliance may include at least one of an Internet of Things (IoT) device or a smart device.

The device information may be configured to include at least one of on or off information (e.g., an activation state of one or more devices), operation level information (the operation level information may refer to information related to level of operation performed by the electronic device, for example, the operation level information can mean information related to the intensity of the sound output by the electronic device or intensity of light output by the electronic device). time information (e.g., a present time at a current location, a time at another location, a scheduled time, etc.), illumination information (e.g., environmental illumination whether by artificial or ambient natural lighting), or arrangement information for an electronic appliance (e.g., a location and disposition of each networked smart device in the location), and/or user information including at least one of gender information, age information, or location information for the user.

The first external electronic device may be a server storing the device information, and may be configured to update the device information according to at least one of expiration of a preset time, reception of a voice command, or detection of a device information change by an electronic appliance.

The second external electronic device may be a server that stores pieces of content, and may be configured to determine the content theme corresponding to the situation information received from the first external electronic device and transmit at least one piece of content matching the determined content theme to the electronic device.

According to certain embodiments, an electronic device may include: an audio module; a communication module; a microphone; a memory; and a processor. The processor may be configured to control: receiving a voice command from the user via the microphone; receiving, upon receiving the voice command, device information from a first external electronic device; obtaining situation information based on the device information and the voice command; transmitting the situation information to a second external electronic device; and reproducing, upon receiving content corresponding to the situation information from the second external electronic device, the received content.

The device information may include information obtained from at least one electronic appliance disposed in a specific space where the electronic device is located, and the at least one electronic appliance may include at least one of an Internet of Things (IoT) device or a smart device.

The device information may be configured to include at least one of on or off information, operation level information, time information, illumination information, or arrangement information for an electronic appliance, or at least one of gender information, age information, or location information for the user.

The first external electronic device may be a server storing the device information, and may be configured to update the device information according to at least one of expiration of a preset time, reception of a voice command, or detection of a device information change by an electronic appliance.

The second external electronic device may be a server that stores pieces of content, and may be configured to determine the content theme corresponding to the situation information received from the electronic device and transmit at least one piece of content matching the determined content theme to the electronic device.

According to certain embodiments, an electronic device may include: an audio module; a communication module; a microphone; a memory; and a processor. The processor may be configured to control: receiving a voice command from the user via the microphone; requesting, upon receiving the voice command, an external electronic device to obtain situation information based on device information and the voice command, and transmit content corresponding to the obtained situation information to the electronic device; and reproducing, upon receiving the content from the external electronic device, the received content.

The device information may include information obtained from at least one electronic appliance disposed in a specific space where the electronic device is located, and the at least one electronic appliance may include at least one of an Internet of Things (IoT) device or a smart device.

The device information may be configured to include at least one of on or off information, operation level information, time information, illumination information, or arrangement information for an electronic appliance, or at least one of gender information, age information, or location information for the user.

The external electronic device may be a server that stores the device information and pieces of content, and it may be configured to: update the device information according to at least one of expiration of a preset time, reception of a voice command, or detection of a device information change by an electronic appliance; determine the content theme corresponding to the situation information received from the electronic device; and transmit at least one piece of content matching the determined content theme to the electronic device.

According to certain embodiments, a method for an electronic device may include: receiving a voice command from the user; requesting, upon receiving the voice command, a first external electronic device to obtain situation information based on device information and the voice command, and transmit the obtained situation information to a second external electronic device; and reproducing, upon receiving content corresponding to the situation information from the second external electronic device, the received content.

The device information may include information obtained from at least one electronic appliance disposed in a specific space where the electronic device is located, and the at least one electronic appliance may include at least one of an Internet of Things (IoT) device or a smart device.

The device information may be configured to include at least one of on or off information, operation level information, time information, illumination information, or arrangement information for an electronic appliance, or at least one of gender information, age information, or location information for the user.

According to certain embodiments, a computer program product (CPP) included in a computer-readable storage medium such that the computer program product may include one or more instructions that, when executed by an electronic device, cause a processor of the electronic device to control: receiving a voice command from a user; requesting, upon receiving the voice command, a first external electronic device to obtain situation information based on device information and the voice command, and transmit the obtained situation information to a second external electronic device; and reproducing, upon receiving content corresponding to the situation information from the second external electronic device, the received content.

The device information may include information obtained from at least one electronic appliance disposed in a specific space where the electronic device is located, and the at least one electronic appliance may include at least one of an Internet of Things (IoT) device or a smart device.

The device information may be configured to include at least one of on or off information, operation level information, time information, illumination information, or arrangement information for an electronic appliance, or at least one of gender information, age information, or location information for the user.

What is claimed is:

1. An electronic device comprising:
   an audio module;
   a communication circuitry;
   a microphone;
   a memory storing programming instructions; and
   a processor, wherein the programming instructions are executable by the processor to cause the electronic device to:
   receive a voice command from a user via the microphone;
   request, upon receiving the voice command, situation information from a first external electronic device based on device information and the voice command, and the situation information including a present location of the user, an illuminance level at the present location, and a current time,
   after receiving the situation information, transmit the situation information to a second external electronic device via the communication circuitry, wherein the second external electronic device selects a media including content for initiating playback based on the situation information; and
   receive the content corresponding to the situation information from the second external electronic device and initiating playback of the received content.

2. The electronic device of claim 1, wherein the device information includes information obtained from at least one electronic appliance disposed in the present location where the electronic device is located, and
   wherein the at least one electronic appliance includes at least one of an Internet of Things (IoT) device and a smart device, and
   wherein selection of the media is further based on an activation status of the at least one electronic appliance, in which the media is selected based on all of the activation status and the situation information.

3. The electronic device of claim 2, wherein the device information is configured to include at least one of on or off information, operation level information, arrangement information for the at least one electronic appliance, and gender information, and age information of the user.

4. The electronic device of claim 2, wherein the first external electronic device includes a server storing the device information, and
   wherein the first external electronic device is configured to update the device information upon detecting at least one of an expiration of a preset time, a reception of a voice command, or a change in operational state in an electronic appliance.

5. The electronic device of claim 1, wherein the second external electronic device includes a server storing media content, and
   wherein selecting the media including the content by the second external electronic device includes: determining a content theme from among a plurality of stored content themes corresponding to the situation information received from the first external electronic device, determining a media content corresponding to the determined content theme, and transmitting at least the determined media content to the electronic device.

6. An electronic device comprising:
   an audio module;
   a communication circuitry;
   a microphone;
   a memory storing programming instructions; and
   a processor, wherein the programming instructions are executable by the processor is configured to cause the electronic device to:
   receive a voice command from a user via the microphone;
   upon receiving the voice command, receive device information from a first external electronic device;
   obtain situation information based on the device information and the voice command, the situation information including a present location of the user, an illuminance level at the present location, and a current time;
   transmit the situation information to a second external electronic device to cause the second external electronic device to retrieve media including content for initiating playback based on the situation information; and
   receive the content from the second external electronic device and reproduce the received content.

7. The electronic device of claim 6, wherein the device information includes information obtained from at least one electronic appliance disposed in the present location where the electronic device is located, wherein the at least one electronic appliance includes at least one of an Internet of Things (IoT) device and a smart device, and wherein selection of the media is further based on an activation status of the at least one electronic appliance, in which the media is selected based on all of the activation status and the situation information.

8. The electronic device of claim 7, wherein the device information is configured to include at least one of on or off information, operation level information, arrangement information for an electronic appliance, and gender information, age information of the user.

9. The electronic device of claim 7, wherein the first external electronic device includes a server storing the device information, and wherein the first external electronic device is configured to update the device information upon detecting at least one of an expiration of a preset time, a reception of a voice command, or a change in operational state in an electronic appliance.

10. The electronic device of claim 6, wherein the second external electronic device includes a server storing media content, and wherein selecting the media including the content by the second external electronic device includes:

determining a content theme from among a plurality of stored content themes corresponding to the situation information received from the electronic device, determining a media content corresponding to the determined content theme, and transmitting at least the determined media content to the electronic device.

11. An electronic device comprising:
an audio module;
a communication circuitry;
a microphone;
a memory storing programming instructions; and
a processor, wherein the programming instructions are executable by the processor to cause the electronic device to:
receive a voice command from a user via the microphone, request, in response to receiving the voice command, an external electronic device to:
identify situation information based on device information and the voice command, the situation information including a present location of the user, an illuminance level at the present location, and a current time, and
select media including the content based on the situation information and transmit the media, and
after receiving the content, output the received content.

12. The electronic device of claim 11, wherein the device information includes information obtained from at least one electronic appliance disposed in the present location where the electronic device is located, and wherein the at least one electronic appliance includes at least one of an Internet of Things (IoT) device or a smart device, and wherein selection of the media is further based on an activation status of the at least one electronic appliance, in which the media is selected based on all of the activation status and the situation information.

13. The electronic device of claim 11, wherein the device information is configured to include at least one of on or off information, operation level information, arrangement information for an electronic appliance, and at least one of gender information, and age information for the user.

14. The electronic device of claim 11, wherein the external electronic device is a server that stores the device information and pieces of content, and wherein the external electronic device is configured to:

update the device information according to at least one of expiration of a preset time, reception of a voice command, or detection of a device information change by an electronic appliance; determine a content theme corresponding to the situation information received from the electronic device; and transmit at least one piece of content matching the determined content theme to the electronic device.

15. A method for an electronic device, the method comprising:
receiving a voice command from a user via a microphone;
in response to receiving the voice command, request, via communication circuitry, an external electronic device to:
identify situation information based on device information and the voice command, and the situation information including a present location of the user, an illuminance level at the present location, and a current time,
select and transmit media including content based on the situation information; and
after receiving the content, controlling, by a processor, an audio module to output the received content.

16. The method of claim 15, wherein the device information includes information obtained from at least one electronic appliance disposed in the present location where the electronic device is located, and wherein the at least one electronic appliance includes at least one of an Internet of Things (IoT) device and a smart device, and wherein selection of the media is further based on an activation status of the at least one electronic appliance, in which the media is selected based on all of the activation status and the situation information.

17. The method of claim 16, wherein the device information is configured to include at least one of on or off information, operation level information, or arrangement information for an electronic appliance, or at least one of gender information, and age information for the user.

18. A computer program product (CPP) included in a non-transitory computer-readable storage medium wherein the computer program product is configured to include one or more instructions that, when executed by an electronic device, cause a processor of the electronic device to:
receive a voice command from a user using a microphone;
upon receiving the voice command, transmit a request to a first external electronic device to obtain situation information based on device information and the voice command using communication circuitry, the situation information including a present location of the user, an illuminance level at the present location, and a current time;
after receiving the situation information, transmit the received situation information to a second external electronic device via the communication circuitry, wherein the second external electronic device selects a media including content for initiating playback based on the situation information; and
after receiving content corresponding to the situation information from the second external electronic device, initiating playback of the received content.

19. The computer program product of claim 18, wherein the device information includes information obtained from at least one electronic appliance disposed in the present location where the electronic device is located, and wherein the at least one electronic appliance includes at least one of an Internet of Things (IoT) device and a smart device, and
wherein selection of the media is further based on an activation status of the at least one electronic appliance, in which the media is selected based on all of the activation status and the situation information.

20. The computer program product of claim 19, wherein the device information is configured to include at least one of on or off information, operation level information, arrangement information for an electronic appliance, gender information, and age information, for the user.

\* \* \* \* \*